(12) United States Patent
Sumiyama et al.

(10) Patent No.: US 8,057,051 B2
(45) Date of Patent: *Nov. 15, 2011

(54) LIGHT SOURCE DEVICE, IMAGE DISPLAY DEVICE, AND MONITOR DEVICE

(75) Inventors: Fumika Sumiyama, Matsumoto (JP); Masatoshi Yonekubo, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 576 days.

This patent is subject to a terminal disclaimer.

(21) Appl. No.: 12/189,858

(22) Filed: Aug. 12, 2008

(65) Prior Publication Data

US 2009/0059992 A1    Mar. 5, 2009

(30) Foreign Application Priority Data

Aug. 30, 2007   (JP) ................................. 2007-224396

(51) Int. Cl.
G03B 21/00 (2006.01)
G03B 21/20 (2006.01)
H01S 3/10 (2006.01)

(52) U.S. Cl. ............................. 353/85; 353/122; 372/23

(58) Field of Classification Search .................... 353/94, 353/122, 84–85; 362/184, 225, 227, 230–231, 362/233, 235; 372/9, 18, 23, 26, 28, 32, 372/34, 36, 39, 43.01, 50.12, 50.124, 92, 372/98–99, 109, 50.121

See application file for complete search history.

(56) References Cited

U.S. PATENT DOCUMENTS

| 5,193,023 A | 3/1993 | Yamada et al. |
|---|---|---|
| 5,526,145 A | 6/1996 | Weber |
| 5,859,945 A | 1/1999 | Kato et al. |
| 6,192,170 B1 | 2/2001 | Komatsu |
| 6,317,170 B1 * | 11/2001 | Hwang et al. ................. 348/750 |

(Continued)

FOREIGN PATENT DOCUMENTS

JP    A-63-137493    6/1988

(Continued)

OTHER PUBLICATIONS

U.S. Appl. No. 11/892,910, filed Aug. 28, 2007.

(Continued)

*Primary Examiner* — Tony Ko
*Assistant Examiner* — Jori S Reilly-Diakun
(74) *Attorney, Agent, or Firm* — Oliff & Berridge, PLC (57) ABSTRACT

A light source device includes a plurality of light emitting elements for emitting light beams, a resonant mirror functioning as a resonator for selectively reflecting the light beams emitted respectively from the light emitting elements, towards the light emitting elements, a wavelength selection element disposed on light paths between the light emitting elements and the resonant mirror, having a plurality of light selection areas for executing selection respectively on the light beams emitted respectively from the light emitting elements, transmitting light beams each having a part of a wavelength band of corresponding one of the light beams emitted respectively from the light emitting elements, and having a narrower width of a wavelength band of the light beam to be transmitted than a width of wavelength band of the light beam to be reflected by the resonant mirror, and a state changing section that changes a state of the plurality of light selection areas, and the state changing section changes the state of the light selection areas so that wavelengths of the light beams selected respectively by the light selection areas become different from each other.

12 Claims, 7 Drawing Sheets

U.S. PATENT DOCUMENTS

| | | | |
|---|---|---|---|
| 6,323,987 B1 | 11/2001 | Rinaudo et al. | |
| 6,488,419 B2 | 12/2002 | Kato et al. | |
| 6,690,873 B2 | 2/2004 | Bendett et al. | |
| 6,947,459 B2 * | 9/2005 | Kurtz et al. | 372/43.01 |
| 7,075,656 B2 * | 7/2006 | Hedin | 356/454 |
| 7,376,168 B2 | 5/2008 | Mikhailov et al. | |
| 7,905,608 B2 * | 3/2011 | Sumiyama et al. | 353/85 |
| 2003/0034985 A1 | 2/2003 | Needham Riddle et al. | |
| 2003/0133485 A1 | 7/2003 | Liu | |
| 2006/0023173 A1 | 2/2006 | Mooradian et al. | |
| 2006/0023757 A1 | 2/2006 | Mooradian et al. | |
| 2006/0082679 A1 * | 4/2006 | Chua et al. | 348/371 |
| 2006/0165144 A1 | 7/2006 | Mikhailov et al. | |
| 2006/0268241 A1 | 11/2006 | Watson et al. | |
| 2006/0280219 A1 | 12/2006 | Shchegrov | |
| 2007/0153862 A1 | 7/2007 | Shchegrov et al. | |
| 2007/0153866 A1 | 7/2007 | Shchegrov et al. | |

FOREIGN PATENT DOCUMENTS

| | | |
|---|---|---|
| JP | A 4-19719 | 1/1992 |
| JP | A-05-013862 | 1/1993 |
| JP | A-08-190111 | 7/1996 |
| JP | A-9-49948 | 2/1997 |
| JP | A-11-87826 | 3/1999 |
| JP | A-11-233894 | 8/1999 |
| JP | A-2000-174397 | 6/2000 |
| JP | A-2001-15856 | 1/2001 |
| JP | A-2001-066718 | 3/2001 |
| JP | A-2001-189520 | 7/2001 |
| JP | A-2001-339118 | 12/2001 |
| JP | A-2002-232049 | 8/2002 |
| JP | A-2002-303904 | 10/2002 |
| JP | A-2003-158318 | 5/2003 |
| JP | A-2004-503923 | 2/2004 |
| JP | A 2004-144794 | 5/2004 |
| JP | A 2004-144936 | 5/2004 |
| JP | A-2005-537643 | 12/2005 |
| WO | WO 02/05038 A2 | 1/2002 |
| WO | WO 2006/105249 A2 | 10/2006 |
| WO | WO 2007/092710 A2 | 8/2007 |

OTHER PUBLICATIONS

Aram Mooradian et al., "High Power Extended Vertical Cavity Surface Emitting Diode Lasers and Arrays and Their Applications" Micro-Optics Conference, Tokyo, Nov. 2, 2005.

* cited by examiner

LIGHT SOURCE DEVICE, IMAGE DISPLAY DEVICE, AND MONITOR DEVICE

BACKGROUND

1. Technical Field

The present invention relates to a light source device, an image display device, and a monitor device.

2. Related Art

In recent years, coherent light sources have become fundamental also to image display devices, the optical communication field, the medical field, and the measurement field such as microscopes (see, e.g., JP-A-8-190111 (Document 1) and JP-A-5-13862 (Document 2)).

The high-frequency generator is provided with an LD, a bandpass filter, and a resonator having a nonlinear optical crystal. Thus, when the light with a fundamental wave emitted from the LD passes through the bandpass filter, the light in a wavelength band of ±0.5 nm around the fundamental wave is resonated. Therefore, since it can be prevented that the light is stabilized at a wavelength shifted out of a phase matching condition, it becomes possible to obtain high power light with harmonic component by making the light pass through the nonlinear optical crystal.

Further, the laser device described in the Document 2 is disposed having a laser medium held between a total reflection mirror and a partial reflection mirror. Further, a bandpass filter is disposed between the laser medium and the partial reflection mirror, thereby obtaining a laser beam with narrow spectrum. Thus, the laser beam emitted from the laser device becomes stabilized light.

However, the laser sources described in the Document 1 and the Document 2 have a disadvantage of having coherency. According to this disadvantage, since an interference pattern appears on a projection surface on which the laser beam is projected as the speckle noise to degrade the image, some countermeasures to the speckle noise becomes necessary in order for displaying a high-resolution image.

As a measure for eliminating the speckle noise, there is proposed a device provided with a plurality of light emitting elements having central wavelengths slightly different in design from each other as an array (see, e.g., JP-T-2004-503923 (Document 3, the term "JP-T" as used herein means a published Japanese translation of a PCT patent application). In the technology described in the Document 3, the light emitting elements are provided as an array to obtain a wider spectrum band in comparison with the case of using a single light emitting element, thereby making it possible to reduce the speckle noise.

However, the device described in the Document 1 for eliminating the speckle noise is based on the premise of using the light source not requiring an external resonator structure, namely the light source directly outputting the laser beam. There is exerted the effect of suppressing the speckle noise in the case with the light source not requiring the external resonator structure, to be sure.

Here, in the case with a light source provided with an external resonator, the fundamental constituents are a light emitting element and a resonator mirror. Further, even in the case of using a plurality of light emitting elements, the resonator mirror for selecting a single wavelength is commonly used taking the cost and easiness of assembling into consideration. In the resonator mirror, the band of the wavelength to be selected needs to be narrowed in order for causing the laser oscillation. As a result, as described in the Document 3, even if variations are provided to the wavelengths of the light emitted from the arrayed light source, a single wavelength is selected by the wavelength selection element, the coherence of the entire light source including the wavelength selection element is not lowered.

Further, the resonator mirror in which the band of wavelength to be selected is narrowed and which reflects the light emitted from the light source is extremely expensive, thus increasing the total cost.

SUMMARY

In view of the problem described above, the invention has an advantage of providing a light source device, an image display device, and a monitor device, which are low-cost, reduce the coherence between the light beams, and suppress the speckle noise.

In order for obtaining the above advantage, the invention provides the following measures.

A light source device according to an aspect of the invention includes a plurality of light emitting elements for emitting light beams, a resonant mirror functioning as a resonator for selectively reflecting the light beams emitted respectively from the light emitting elements, towards the light emitting elements, a wavelength selection element disposed on light paths between the light emitting elements and the resonant mirror, having a plurality of light selection areas for executing selection respectively on the light beams emitted respectively from the light emitting elements, transmitting light beams each having a part of a wavelength band of corresponding one of the light beams emitted respectively from the light emitting elements, and having a narrower width of a wavelength band of the light beam to be transmitted than a width of wavelength band of the light beam to be reflected by the resonant mirror, and a state changing section that changes a state of the plurality of light selection areas, and the state changing section changes the state of the light selection areas so that wavelengths of the light beams selected respectively by the light selection areas become different from each other.

It should be noted that the clause "selectively reflecting the light beams" regarding the resonant mirror denotes that the resonator reflects the incident light beams at a high rate and partially transmits the incident light beams.

In the light source device according to this aspect of the invention, light beams in a certain wavelength band out of the light beams emitted from the plurality of light emitting elements are transmitted in the wavelength selection element. The light beams transmitted in the wavelength selection element become narrow-band, and reflected by the resonant mirror to be resonated between the light emitting element and the resonant mirror and amplified. Further, the state changing section changes the state of the light selection areas of the wavelength selection element so that the wavelengths of the light beams selected respectively by the light selection areas become different from each other. Thus, the wavelengths of the light beams are different between the light selection areas. Therefore, even in the case in which the peak wavelengths of the light beams emitted from the light emitting elements are the same, each of the light beams emitted from the light emitting elements has some extent of width of wavelength band, and consequently, the light beams with different wavelengths in the wavelength band are amplified and taken out. Therefore, the wavelength band of the light beam transmitted through the resonant mirror should be widened as a whole. Thus, since the coherence between the amplified light beams emitted from the resonant mirror is reduced, it becomes possible to suppress the speckle noise.

By thus providing the wavelength selection element, the wavelength bandwidth of the reflected light beam of the resonant mirror can be expanded. In contrast, in the case in which the wavelength selection element is not used, since a volume Bragg grating (VBG) element having a narrow width of the wavelength band and high reflectivity needs to be used as the resonant mirror, the light source device becomes extremely expensive. However, according to this aspect of the invention, since the low-cost resonant mirror with a large wavelength bandwidth of the reflected light beam can be used, cost reduction of the entire device can be achieved.

Further, in the light source device according to this aspect of the invention, it is preferable that the state changing section is provided to each of the light selection areas.

In the light source device according to this aspect of the invention, since the state changing section is provided to each of the light selection areas of the wavelength selection element, it becomes possible to surely make the wavelengths of the light beams emitted from the respective light selection areas different from each other. In other words, since the state can be changed in every light selection area, freedom of a variation in the output wavelength distribution of the light beam emitted from the wavelength selection element can be increased.

Further, in the light source device according to this aspect of the invention, it is preferable that a state detection section that detects the state of the plurality of light selection areas is further provided, and the state changing section changes the state of the plurality of light selection areas in accordance with the state of the plurality of light selection areas detected by the state detection section so that the wavelengths of the respective light selection areas become different from each other.

In the light source device according to this aspect of the invention, the state detection section detects the state of the plurality of light selection areas of the wavelength selection element, and the state changing section changes the state of the plurality of light selection areas of the wavelength selection element in accordance with the state thereof thus detected so that the wavelengths of the light beams selected by the respective light selection areas become different from each other. On this occasion, since the state of the plurality of light selection areas of the wavelength selection element is changed by the state changing section in accordance with the state thereof detected by the state detection section, it is possible to further surely make the wavelengths of the light beams emitted from the respective light selection areas different from each other.

Further, in the light source device according to this aspect of the invention, it is preferable that the state detection section is provided to each of the light selection areas.

In the light source device according to this aspect of the invention, the wavelength selection element is provided with the state detection sections corresponding respectively to the light selection areas. On this occasion, the state detection section detects the state of each the light selection areas of the wavelength selection element, and the state changing section changes the state of the plurality of light selection areas of the wavelength selection element in accordance with the state thereof thus detected so that the wavelengths of the light beams selected by the respective light selection areas become different from each other.

Therefore, it becomes possible to align the wavelengths of the light beams emitted from the light emitting elements and the wavelengths of the light beams selected by the respective light selection areas with each other. Thus, even in the case in which the light emitting elements have a variation in the output wavelength due to the manufacturing error, it becomes possible to improve the efficiency of the light beams emitted from the wavelength selection element while reducing the speckle noise.

Further, in the light source device according to this aspect of the invention, it is preferable that the state detection section is a temperature detection section that detects the temperature of the plurality of light selection areas, and the state changing section is a temperature varying section that varies the temperature between the light selection areas in accordance with the temperature detected by the temperature detection section.

In the light source device according to this aspect of the invention, since the temperature varying section varies the temperature between the light selection areas of the wavelength selection element, the distance of the grating inside the wavelength selection element is varied in accordance with the temperature of the light selection areas. Thus, the wavelengths of the light beams selected in the respective light selection areas in the wavelength selection element should be different from each other. Therefore, the light beams emitted from the light emitting elements and further emitted from the respective light selection areas of the wavelength selection element become different in wavelength from each other. As described above, the distance of the periodic grating inside the wavelength selection element is varied only by varying the temperature of the light selection areas without applying any external force to the wavelength selection element. Thus, since the coherence between the light beams reflected by the respective areas of the wavelength selection element and thus amplified is reduced, it becomes possible to suppress the speckle noise with a simpler and easier configuration.

A light source device according to another aspect of the invention includes a plurality of light emitting elements for emitting light beams, a wavelength conversion element having a plurality of light transmission areas through which the light beams emitted respectively from the light emitting elements are respectively transmitted, and converting wavelengths in at least a part of a wavelength band of the light beams emitted from the light emitting elements, a resonant mirror functioning as a resonator for selectively reflecting the light beams emitted respectively from the light emitting elements, towards the light emitting elements, a wavelength selection element having a plurality of light selection areas for executing selection respectively on the light beams emitted respectively from the light emitting elements, transmitting light beams each having a part of a wavelength band of corresponding one of the light beams emitted respectively from the light emitting elements, and having a narrower width of a wavelength band of the light beam to be transmitted than a width of wavelength band of the light beam to be reflected by the resonant mirror, and a selection side state changing section that changes a state of the plurality of light selection areas of the wavelength selection element, and the selection side state changing section changes the state of the light selection areas of the wavelength selection element so that wavelengths of the light beams selected respectively by the light selection areas of the wavelength selection element become different from each other.

In the light source device according to this aspect of the invention, in the case of emitting a green light beam, for example, a light source with a wavelength of 1060 nm is used as each of the light emitting elements. The light beam with the wavelength of 1060 nm emitted from the light source enters the wavelength conversion element, and converted into a light beam with a half wavelength thereof. Subsequently, the light beam is transmitted through the wavelength selection element disposed, for example, between the wavelength conversion element and the resonant mirror to be a light beam with a narrow wavelength band. Thus, the light beam emitted from the light emitting element is transmitted through the wavelength conversion element and the wavelength selection element, and repeatedly reflected by the light emitting element and the resonant mirror. Then, the light beam converted into the green light beam is emitted from the resonant mirror.

Further, on this occasion, the state of the plurality of light selection areas of the wavelength selection element is changed by the selection side state changing section. Thus, it becomes possible to surely make the wavelengths of the light beams emitted respectively from the light selection areas different from each other.

Further, as described above, according to this aspect of the invention, since the low-cost resonant mirror with a large wavelength bandwidth of the reflected light beam can be used, cost reduction of the entire device can be achieved.

Further, in the light source device according to this aspect of the invention, it is preferable that a selection side state detection section that detects a state of the plurality of light selection areas of the wavelength selection element is further provided, and the selection side state changing section changes the state of the plurality of light selection areas in accordance with the state of the plurality of light selection areas detected by the selection side state detection section so that the wavelengths of the respective light selection areas of the wavelength selection element become different from each other.

In the light source device according to this aspect of the invention, the selection side state detection section detects the state of the plurality of light selection areas of the wavelength selection element, and the selection side state changing section changes the state of the plurality of light selection areas of the wavelength selection element in accordance with the state thereof thus detected so that the wavelengths of the light beams selected by the respective light selection areas become different from each other. On this occasion, since the state of the plurality of light selection areas of the wavelength selection element is changed by the selection side state changing section in accordance with the state thereof detected by the selection side state detection section, it is possible to further surely make the wavelengths of the light beams emitted from the respective light selection areas different from each other.

Further, in the light source device according to this aspect of the invention, it is preferable that the selection side state detection section is a temperature detection section that detects the temperature of the plurality of light selection areas of the wavelength selection element, and the selection side state changing section is a temperature varying section that varies the temperature between the light selection areas of the wavelength selection element in accordance with the temperature detected by the temperature detection section.

Further, in the light source device according to this aspect of the invention, since the state detection section is the temperature detection section, there can be obtained the same advantage as in the case in which the state changing section is the temperature varying section.

Further, in the light source device according to this aspect of the invention, it is preferable that a conversion side state changing section that changes a state of the plurality of light transmission areas of the wavelength conversion element so that the wavelengths of the light beams converted by the respective light transmission areas become different from each other is further provided.

In the light source device according to this aspect of the invention, since the state of the plurality of light transmission areas of the wavelength conversion element is changed by the conversion side state changing section, it becomes possible to surely make the wavelengths of the light beams emitted from the respective light transmission areas different from each other.

Therefore, the light beam with a desired wavelength can be obtained by the wavelength conversion element, and it becomes possible to emit the light beam with suppressed speckle noise.

An image display device according to still another aspect of the invention includes the light source device described above, a light modulation device for modulating the light beam emitted from the light source device in accordance with an image signal to form an image, and a projection device for projecting the image formed by the light modulation device.

In the image display device according to this aspect of the invention, the light beam emitted from the light source device enters the light modulation device. Then, the image formed by the light modulation device is projected by the projection device. On this occasion, since the light beam emitted from the light source device is a light beam with reduced coherence as described above, the light beam projected by the projection device becomes a light beam with suppressed speckled noise. Therefore, clear images can be displayed.

An image display device according to still another aspect of the invention includes the light source device described above, and a scan section that scans a projection screen with the light beam emitted from the light source device.

In the image display device according to this aspect of the invention, the light beam emitted from the light source device is scanned by the scan section. Then, the light beam thus scanned by the scan section is projected on a projection surface. On this occasion, since the light beam emitted from the light source device is a light beam with reduced coherence as described above, the light beam projected on the projection surface becomes a light beam with suppressed speckled noise. Therefore, it becomes possible to display high-quality images without a brightness variation.

A monitor device according to still another aspect of the invention includes the light source device described above, and an imaging section that shoots an object illuminated by the light source device.

In the monitor device according to this aspect of the invention, the light beam emitted from the light source device illuminates the object, and the imaging section shoots the object. On this occasion, as described above, since the light source device emits the light beam with reduced coherence, the object is illuminated with the bright light beam without a brightness variation. Therefore, it becomes possible to shoot the object clearly by the imaging section.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Hereinafter, some embodiments of a light source device, an image display device, and a monitor device according to the invention will be explained with reference to the accompanying drawings. It should be noted that the scale size of each member is accordingly altered so that the member is shown large enough to be recognized in the drawings below.

First Embodiment

Then, a first embodiment of the invention will be explained with reference to FIGS. 1 through 4.

Figure 1:
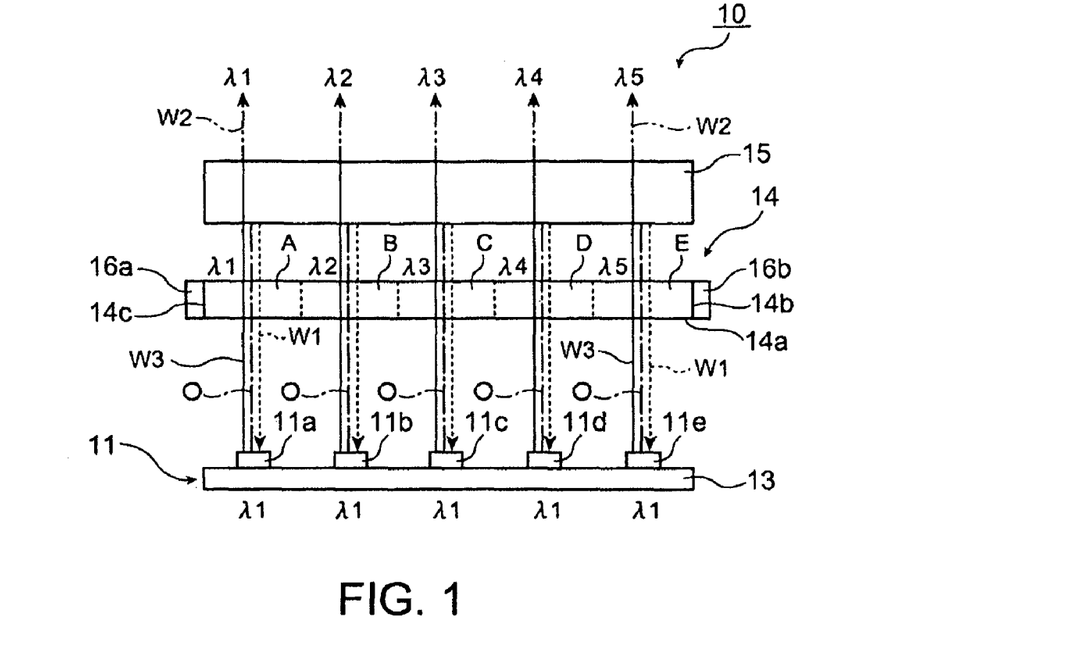
FIG. 1 is a plan view showing a light source device according to a first embodiment of the invention.

As shown in FIG. 1, the light source device 10 according to the present embodiment is provided with a light emitting section 11, a wavelength selection element 14, and a resonant mirror 15.

The light emitting section 11 is provided with five light emitting elements 11a, 11b, 11c, 11d, 11e (semiconductor lasers LD) for emitting laser beams. These light emitting elements 11a through 11e are all supported by a support section 13. Peak wavelengths of the light beams emitted from the light emitting elements 11a through 11e are substantially identical to each other. It should be noted that they do not need to be completely identical to each other, and some extent of variation is allowed therebetween. The variation is typically several nanometers in many cases owing to a manufacturing error of the light emitting elements.

The wavelength selection element 14 is an element for transmitting the light with a part of the wavelength band of the light emitted form the light emitting section 11, namely for transmitting the light therefrom after narrowing the width of the spectral line, and a bandpass filter, an etalon, a grating, and so on can be used as the wavelength selection element 14. In the present embodiment, the bandpass filter for narrowing the band of the wavelength by repeatedly reflecting the light is used as the wavelength selection element 14.

The wavelength selection element 14 narrows the width of the wavelength band in the spectral line width of the light emitted from the light emitting section 11 within the band of about 5 nm wide. Further, it is preferable that the wavelength selection element 14 narrows the width of the wavelength band in the spectral line width of the light emitted from the light emitting section 11 within the band of about 10 nm wide.

As shown in FIG. 1, Peltier elements 16a, 16b (a state changing section, a temperature varying section) are bonded on one end surface 14c (an end surface on an area A side described later) perpendicular to an entrance end surface 14a of the wavelength selection element 14, which the light emitted from the light emitting section 11 enters, and the other end surface 14d (an end surface on an area E side described later) opposed to the end surface 14c.

Here, in a substrate forming the wavelength selection element 14, areas (light selection areas) in which the light beams emitted from the light emitting elements 11a, 11b, 11c, 11d, 11e are defined as areas A, B, C, D, and E, respectively. It should be noted that the areas A through E are actually continuous areas in which values of the selection wavelength and the temperature vary gradually, and consequently have no physical boundary therebetween.

Further, since the one end surface 14c and the other end surface 14d of the wavelength selection element 14 are respectively provided with the Peltier elements 16a, 16b, the wavelength selection element 14 is heated or cooled in a direction perpendicular to central axis O of the laser beam, namely the direction from Peltier element 16a to the Peltier element 16b or the direction from Peltier element 16b to the Peltier element 16a. Further, the temperature set to the Peltier element 16a and the temperature set to the Peltier element 16b are different from each other, a temperature gradient should be caused inside the wavelength selection element 14. The wavelength selection element 14 expands in response to heating, or shrinks in response to cooling, thus the refractive index thereof is varied. In response to the thermal expansion, the selection wavelength of the wavelength selection element 14, namely the wavelength of the light transmitted by the wavelength selection element 14, is varied. The larger the distortion is, the shorter the selection wavelength becomes, and the smaller the distortion becomes, the longer the selection wavelength becomes. The thermal expansion is thought to be a kind of distortion, and consequently, the higher the temperature of the area is, and the larger the thermal expansion caused in the area is, the more the selection wavelength is shifted to the long wavelength side.

In other words, assuming that the selection wavelengths in the areas A, B, C, D, and E of the wavelength selection element 14 are $\lambda 1, \lambda 2, \lambda 3, \lambda 4, \lambda 5$, respectively, the relationship of $\lambda 1 > \lambda 5 > \lambda 2 > \lambda 4 > \lambda 3$ is obtained. Further, the wavelengths of the light beams W2 emitted from the areas A, B, C, D, and E of the wavelength selection element 14 and transmitted through the resonant mirror 15 become $\lambda 1, \lambda 2, \lambda 3, \lambda 4, \lambda 5$, respectively, the relationship of $\lambda 1 > \lambda 5 > \lambda 2 > \lambda 4 > \lambda 3$ is obtained.

It should be noted that since the wavelengths $\lambda 1$ through $\lambda 5$ vary in accordance with the temperature in the areas A through E of the wavelength selection element 14, it is also possible to set the values of $\lambda 1, \lambda 2, \lambda 3, \lambda 4, \lambda 5$, or the differences between these values to desired values by controlling the Peltier elements 16a, 16b.

The resonant mirror 15 reflects the light emitted from the light emitting elements 11a through 11e at a high rate, and partially transmits the light. Specifically, it functions as the resonator mirror for the light emitting elements 11a through 11e by selecting the light W1 (illustrated with the broken line shown in FIG. 1), which is a part of the light with a predetermined wavelength out of the light emitted from the wavelength selection element 14, and reflecting it towards the light emitting section 11, and at the same time, transmits the remaining light W2 (illustrated with the chain double-dashed line shown in FIG. 1). It should be noted that the light W1 has a proportion of about 98 through 99% in the light with a predetermined wavelength out of the light emitted from the wavelength selection element 14.

The width of the wavelength band of the light emitted by the resonant mirror 15 is set larger than the width of the wavelength band of the light transmitted in the wavelength selection element 14. Specifically, the width of the wavelength band of the reflected light of the resonant mirror 15 is about 400 nm.

It is arranged that the light W3 (illustrated with a solid line shown in FIG. 1) with the fundamental wave emitted from the light emitting section 11 is repeatedly reflected by the light emitting section 11 and the resonant mirror 15 to be amplified, and then, emitted from the resonant mirror 15 as the laser beam W2. Although the resonant mirror 15 transmits the light with various wavelengths, only the light with a predetermined wavelength among the light is amplified. The intensity of the light thus amplified is extremely high compared to the intensity of the light with other wavelengths. Therefore, the light W2 transmitted through the resonant mirror 15 can be regarded as the light with a substantially single wavelength. The wavelength of the light W2 is substantially the same as the selection wavelength of the wavelength selection element 14, namely the wavelength of the light transmitted through the wavelength selection element 14. Further, since the resonant mirror 15 reflects a part (about 98 through 99%) of the light with a predetermined wavelength, the rest (about 1 through 2%) of the light is used as the output light.

Then, a specific example of the light source device 10 according to the present embodiment will hereinafter be described.

Firstly, the light emitting elements 11a through 11e are red semiconductor lasers and each arranged to emit light with the peak wavelength of $\lambda 1=630$ nm. The peak wavelengths are not required to be completely identical in all of the light emitting elements 11a through 11e, but can include some extent of variation. The variation is typically several nanometers in many cases owing to a manufacturing error of the light emitting elements. Further, on this occasion, by controlling the Peltier elements 16a, 16b so that the selection wavelengths $\lambda 1, \lambda 2, \lambda 3, \lambda 4, \lambda 5$ in the areas A, B, C, D, and E of the wavelength selection element 14 become 630 nm, 628 nm, 626 nm, 627 nm, and 629 nm (the maximum difference between the selection wavelengths is 4 nm), respectively, the wavelengths of the light beams W2 emitted from the areas A, B, C, D, and E of the wavelength selection element 14 and transmitted through the resonant mirror 15 also become 630 nm, 628 nm, 626 nm, 627 nm, and 629 nm, respectively.

As described above, in the light source device 10 according to the present embodiment, since the wavelength selection element 14 having a plurality of area A through E with the selection wavelengths different from each other is provided, it becomes possible to vary the wavelengths of the light beams emitted respectively from the areas A through E. Therefore, since the wavelength band of the light emitted from the resonant mirror 15 becomes wider compared to the case in which the light beams with the same wavelengths are emitted from all of the areas of the wavelength selection element 14, the coherence between the laser beams is reduced. As a result, it becomes possible to obtain the light source device 10 with suppressed speckle noise.

Further, since the size of the wavelength selection element 14 is not different from the size used normally not to cause growth in the size of the device, downsizing of the entire device becomes possible.

As described above, the light source device 10 according to the present embodiment of the invention can stay small-sized, reduce the coherence between the laser beams, and suppress the speckle noise.

Further, since the wavelength selection element 14 having a narrow width of the wavelength band of the light transmitted therethrough is provided, the width of the wavelength band of the light reflected by the resonant mirror 15 can be expanded. If the wavelength selection element 14 is not used, since a volume Bragg grating (VBG) element having a narrow width (e.g., 0.1 nm) of the wavelength band and high reflectivity needs to be used as the resonant mirror, the light source device becomes extremely expensive. However, in the present embodiment, since it is possible to use the wavelength selection element 14 with the width of the wavelength band of the transmitted light of about 10 nm and the resonant mirror 15, which is low-price and has large width of wavelength band of the reflected light of about 400 nm, it becomes possible to achieve the cost reduction of the entire device.

In other words, it becomes possible that the light source device according to the present embodiment stays low-price, reduces the coherence between the beams, and suppresses the speckle noise.

It should be noted that although in the present embodiment, those having peak wavelengths roughly identical to each other are used as the plurality of light emitting element 11a through 11e, it is possible to use the light emitting elements with peak wavelengths different from each other purposely. Specifically, it is possible to control the Peltier elements 16a, 16b so that the light beams with the same wavelengths as those of the light emitting elements 11a through 11e are selected in the areas A through E of the wavelength selection element 14, respectively.

Further, in the present embodiment, although the Peltier elements 16a, 16b are used as the state changing section, the piezoelectric element for providing distortion can also be used instead thereof. As the piezoelectric element, piezoelectric ceramics and piezoelectric crystals such as quartz crystal, lead titanate ($PbTiO_3$), lead zirconate ($PbZrO_3$), or barium titanate ($BaTiO_3$) can be used.

The piezoelectric element is displaced in response to application of a voltage, and the displacement causes the distortion in the wavelength selection element 14. The larger the distortion of the wavelength selection element 14 is, the shorter the selection wavelength of the wavelength selection element 14 becomes. Therefore, by providing another piezoelectric element (the state changing section) for detecting the distortion of the areas A through E, and controlling the amounts of distortion in the areas A through E by the piezoelectric element in accordance with the distortion detected by the another piezoelectric element, it becomes possible to make the wavelengths of the light beams emitted from the areas A through E different from each other. It should be noted that as the device for providing the distortion, a strain gauge and a magnetostrictive element, for example, can also be used instead of the piezoelectric element.

Further, although in the present embodiment, the Peltier elements are disposed on the both end surfaces 14c, 14d of the wavelength selection element 14, it is also possible to dispose the Peltier element only on one surface thereof to form the temperature gradient in a direction from the area A to the area E, or a direction from the area E to the area A.

Figure 2:
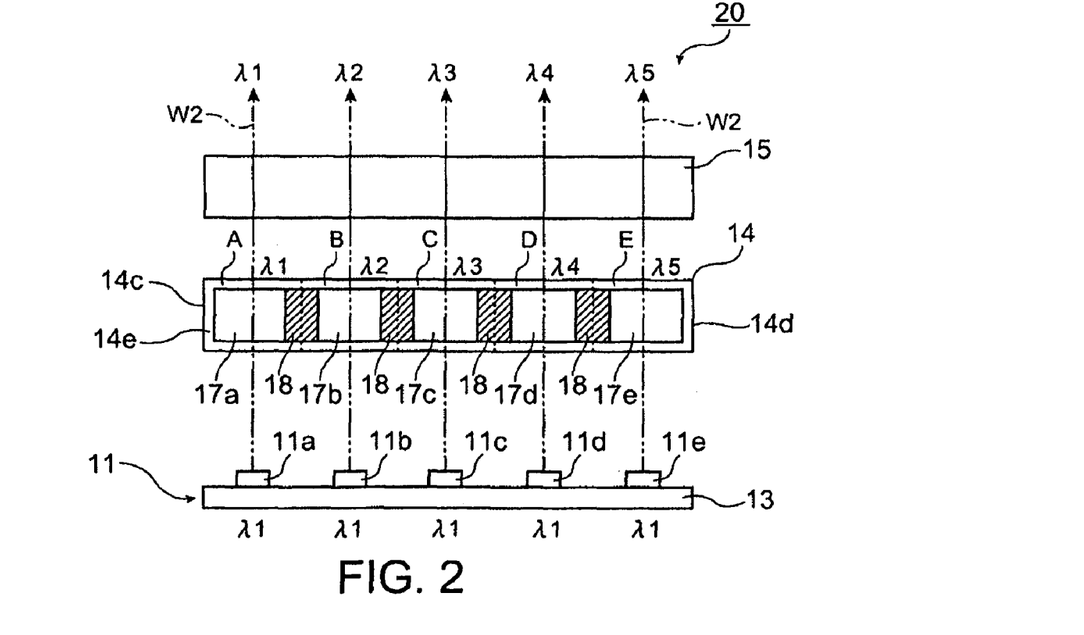
FIG. 2 is a plan view showing a modified example of the light source device shown in FIG. 1.

Further, as shown in FIG. 2, there can also be adopted a light source device 20 provided with Peltier elements 17a through 17e disposed on a surface 14e, which is perpendicular to both of the entrance end surface 14a and the exit end surface 14b and includes the areas A through E, corresponding to the respective areas A through E with gaps there between instead of the both end surfaces 14c, 14d of the wavelength selection element 14. Further, it is preferable to provide heat-insulating materials 18 between the adjacent Peltier elements 17a through 17e of the respective areas A through E so as to prevent heat from being conducted between the adjacent areas A through E. Further, different temperature is set to each of the Peltier elements 17a through 17e. According to this configuration, it is possible to surely make the wavelengths of the light beams, which are emitted respectively from the plurality of areas A through E, different from each other. It should be noted that the Peltier element can be provided every plural number of areas out of the areas A through E.

Further, although in the example described above, the single wavelength selection element 14 is provided to the plurality of light emitting elements 11a through 11e, and the single substrate is divided into the plurality of areas, it is also possible to adopt a configuration of providing the wavelength selection element individually to every light emitting element.

Further, it is also possible to control the temperature by one Peltier element every plural number of areas out of the areas A through E, namely by combining two or three areas. Also in the case with this configuration, it is possible to provide temperature so that the wavelengths of the light beams selected by the plurality of areas A through E are different from each other.

Figure 3:
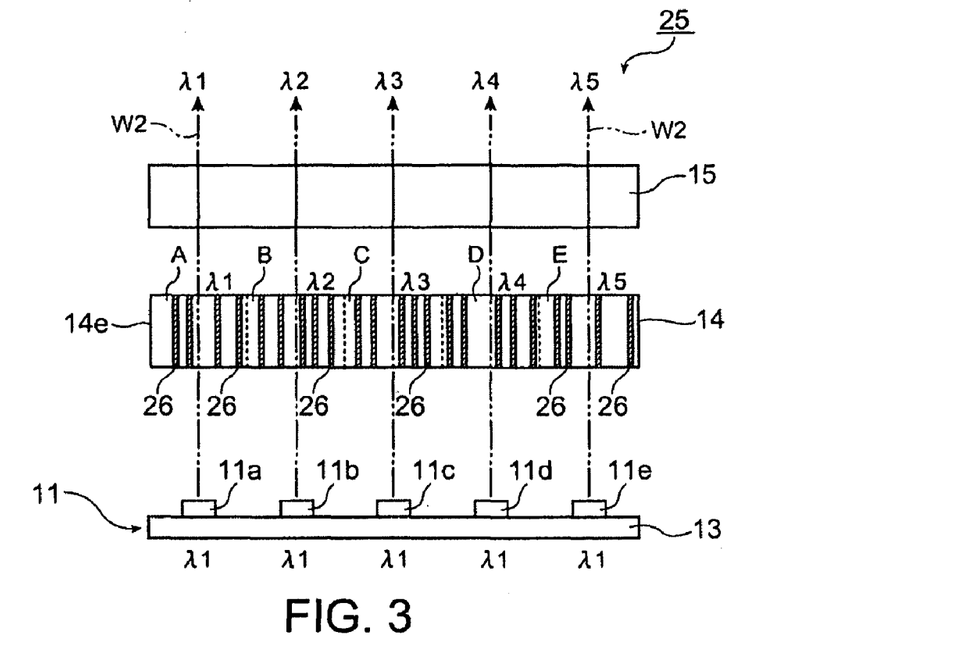
FIG. 3 is a plan view showing a modified example of the light source device shown in FIG. 1.

Further, as shown in FIG. 3, there can be adopted a light source device 25 having a plurality of electrically-heated wires 26 (the state changing section, the temperature varying section) disposed irregularly (randomly) on the surface 14e of the wavelength selection element 14. Thus, since the plurality of electrically-heated wires 26 is arranged irregularly, even if the plurality of electrically-heated wires 26 is heated at the same temperature, the temperature varies between the areas A through E. Therefore, since the wavelengths of the light beams emitted respectively from the areas A through E should be different from each other, the speckle noise can be suppressed.

Further, although in the specific example, the maximum difference in wavelength between the light beams emitted respectively from the areas A through E is assumed to be about 4 nm, the chromaticity of the light sensed by the human does not vary providing the maximum difference is within the range of about 10 nm. As described above, by suppressing the maximum difference in wavelength between the light beams emitted respectively from the areas A through E within the range of about 10 nm, in the case of using the light source device 10 for an image display device, for example, it becomes possible to display an extremely sharp image.

Further, it is possible to provide the temperature sensor (a state detection section, a temperature detection section) for each of the areas A through E, or for a plurality of areas out of the areas A through E. The temperature sensor is for measuring the temperature of the areas A through E of the wavelength selection element 14. Further, in the present configuration, the Peltier elements 16a, 16b and the temperature sensors are connected to a temperature control section. Further, the temperature control section controls the Peltier elements 16a, 16b in accordance with the temperature detected by the temperature sensors provided respectively to the areas A through E. On this occasion, by varying the state of the areas A through E of the wavelength selection element 14 in accordance with the condition detected by the temperature sensors using the Peltier elements 16a, 16b, it is possible to surely make the wavelengths of the light beams emitted from the plurality of areas A through E different from each other.

Modified Example of First Embodiment

Figure 4:
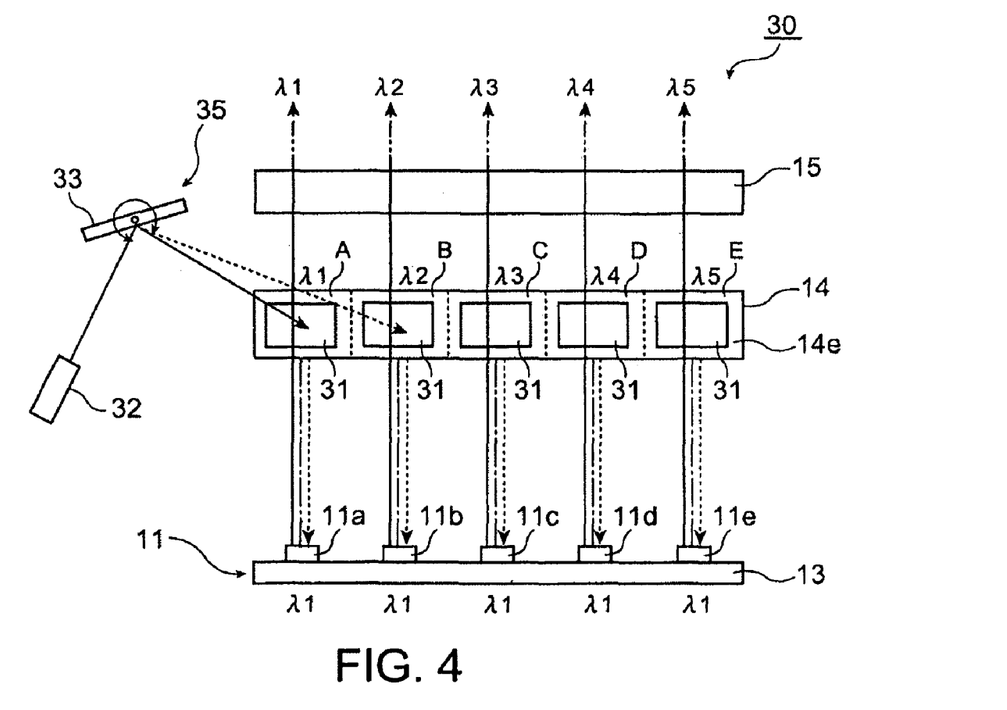
FIG. 4 is a plan view showing a modified example of the light source device shown in FIG. 1.

Although in the first embodiment shown in FIG. 1, the Peltier elements 16a, 16b are used for varying the temperature in the areas A through E, there can be adopted a light source device 30 using a temperature varying section 35 (the state changing section) instead of the Peltier elements 16a, 16b as shown in FIG. 4.

The temperature varying section 35 used in the light source device 30 is provided with heat-absorber films 31, a heat generating laser source 32, and a mirror 33.

The heat-absorber films 31 are provided respectively to the areas A through E on the surface 14e with predetermined intervals. The heat-absorber films 31 are disposed on the surface 14e by bonding or vapor deposition. It should be noted that it is possible to provide heat-insulating materials between the adjacent heat-absorber films 31 of the areas A through E so as to prevent the heat from being conducted between the adjacent areas A through E. Further, the film thicknesses of the heat-absorber films 31 are the same in the areas A through E.

Further, the mirror 33 is for scanning the laser beam emitted from the heat generating laser source 32 towards the heat-absorber films 31. Further, which one of the heat-absorber films 31 of the areas A through E is irradiated with the light beam is controlled by controlling the tilt angle of the mirror 33, and the time period in which the mirror 33 is held at a certain angle is determined, thereby controlling the irradiation time of the light beam to the heat-absorber films 31. Thus, the longer the irradiation time of the laser is, the more the temperature of the heat-absorber film 31 rises, and the temperature of the areas A through E rises. Further, the time periods in which the heat-absorber films 31 are irradiated with the laser beam are controlled so that the temperature varies between the areas A through E.

Also in the light source device 30 of the present modified example, the speckle noise can be reduced and the efficiency of the light can be improved similarly to the case with the light source device according to the first embodiment.

It should be noted that although in the present modified example, the thicknesses of the heat-absorber films 31 are arranged to be the same, it is also possible to make the film thicknesses of the heat-absorber films 31 different from each other. Specifically, since the larger the thickness of the heat-absorber film 31 is, the larger the amount of heat absorption becomes, and the more the temperature rises, according to the present modified example, it is possible to provide the temperature distribution to the areas A through E of the wavelength selection element 14 without varying the scanning rate (the irradiation time period of one of the heat-absorber films 31 with the light beam) of the mirror 33. Therefore, since the irradiation time period with the laser beam is not varied between the areas A through E, and the scanning rate of the single scan in which the mirror 33 is swung from the area A to the area E can be kept constant, the control of the mirror 33 becomes easy.

It should be noted that although the heat-absorber films 31 are provided corresponding respectively to the areas A through E, it is also possible to provide the heat-absorber film 31 on the entire surface 14e of the wavelength selection element 14.

Further, an MEMS mirror can also be used as the mirror 33.

Second Embodiment

A second embodiment according to the invention will now be explained with reference to FIGS. 5 through 7. It should be noted that in the drawing of each of the embodiments described hereinafter, portions with configurations common to the light source device 10 according to the first embodiment described above will be denoted with the same reference numerals, and the explanations therefor will be omitted.

Figure 5:
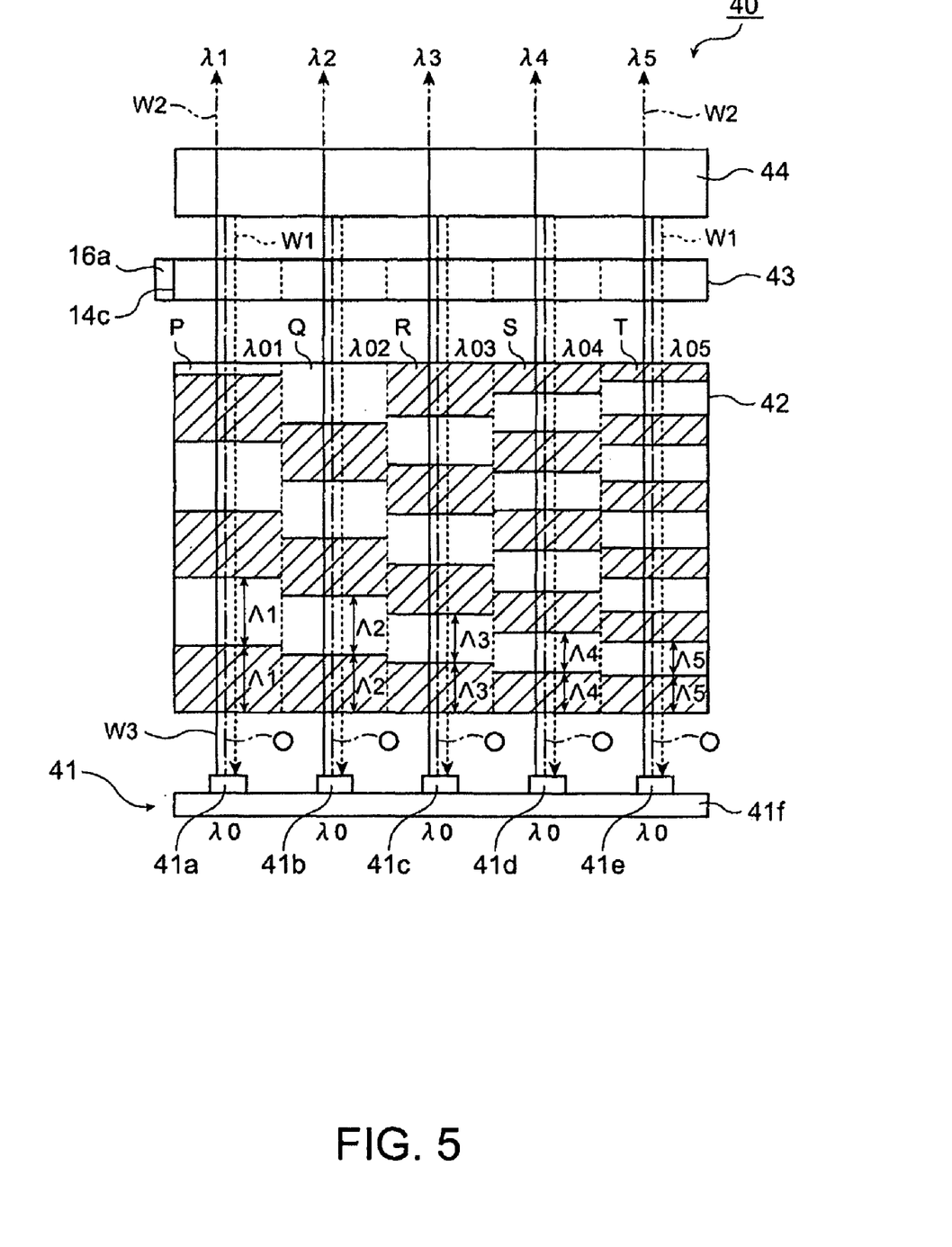
FIG. 5 is a plan view showing a light source device according to a second embodiment of the invention.
Figure 6:
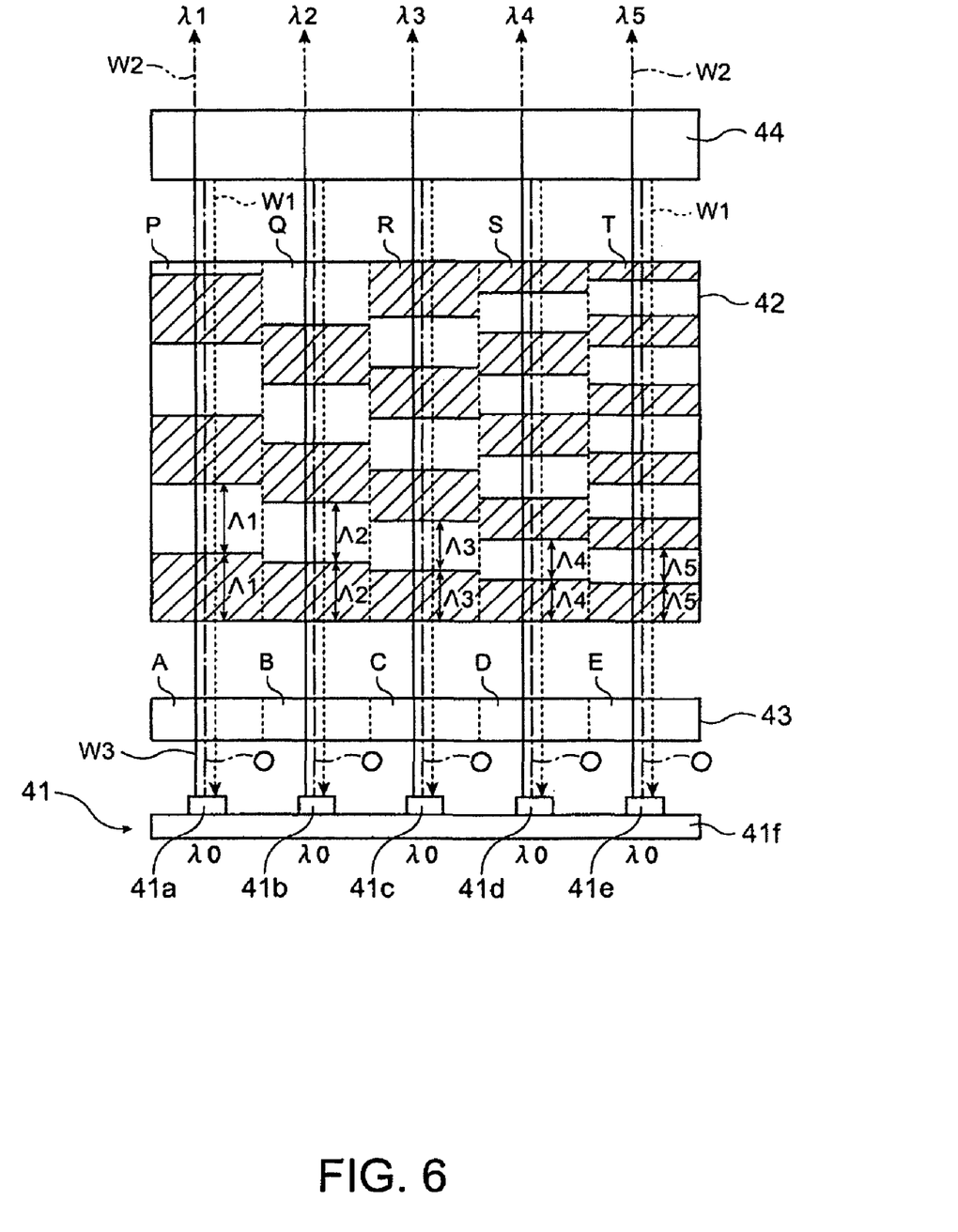
FIG. 6 is a plan view showing a modified example of the light source device shown in FIG. 5.

As shown in FIG. 5, a light source device 40 according to the present embodiment is provided with a light emitting section 41, a wavelength conversion element 42 for converting the wavelength of the light emitted from the light emitting section 41, a wavelength selection element 43 for selectively transmitting the light with the wavelength converted by the wavelength conversion element 42, and a resonant mirror 44 for selectively reflecting the light transmitted through the wavelength selection element 43.

The light emitting section 41 has a configuration in which five light emitting elements 41a, 41b, 41c, 41d, 41e are linearly supported by a support section 41f. Peak wavelengths λ0 of the light beams emitted from the light emitting elements 41a through 41e are substantially identical to each other. It should be noted that they do not need to be completely identical to each other, and some extent of variation is allowed therebetween. The variation is typically several nanometers in many cases owing to a manufacturing error of the light emitting elements. The peak wavelength λ0 is 920 nm in the case with a blue laser source device for emitting a blue laser beam, 1060 nm in the case with a green laser source device for emitting a green laser beam, or 1240 nm in the case with a red laser source for emitting a red laser beam, for example. It should be noted that these wavelengths are nothing more than mere examples.

The wavelength conversion element 42 (a second harmonic generation (SHG) element) is a nonlinear optical element for converting the incident light into the light with a roughly half the wavelength thereof. The light W3 emitted from the light emitting section 41 and proceeds towards the wavelength selection element 43 is converted into the light with a roughly half the wavelength thereof after passing through the wavelength conversion element 42. The wavelength conversion efficiency of the wavelength conversion element 42 has a nonlinear characteristic, in which the higher the intensity of the laser beam entering the wavelength conversion element 42 is, the more the conversion efficiency improved, for example. Further, the conversion efficiency of the wavelength conversion element 42 is in a range of about 40 through 50%. In other words, the entire laser beam emitted from the light emitting section 41 is not necessarily converted into the laser beam with a predetermined wavelength.

As the wavelength conversion element 42, a plate-like element is used. The wavelength conversion element 42 is divided into five areas P, Q, R, S, and T corresponding respectively to the plurality of light emitting elements 41a through 41e. In other words, the areas through which the light beams emitted from the light emitting elements 41a, 41b, 41c, 41d, 41e are transmitted are defined as the areas (light transmission areas) P, Q, R, S, and T, respectively.

Further, the wavelength conversion element 42 has a periodic polarization structure, namely a repetitive structure of domains with the polarization inverted from each other, in each, of the areas P through T. It is arranged that the wavelength of the incident light is converted when the light is transmitted through the inside of the periodic polarization structure. The widths (hereinafter referred to as "pitches") of each of the domains of the areas P, Q, R, S, and T in the wavelength conversion element 42 in the directions of the center axes O of the laser beams are defined respectively as Λ1, Λ2, Λ3, Λ4, Λ5. The pitches Λ1 through Λ5 are different from each other, and have the relationship of Λ1>Λ2>Λ3>Λ4>Λ5.

Such periodic polarization structures can be formed by making the pitches different from each other in the manufacturing process. Firstly, an electrode pattern shaped like stripes having the areas with the electrode and the areas without the electrode arranged alternately along the direction of the center axis O of the laser beam is provided to a substrate made of a nonlinear ferroelectric material (e.g., $LiTaO_3$). On this occasion, the width of each of the electrode patterns and the distance between the adjacent electrode patterns are optimized so that the pitches of each domain in the areas P, Q, R, S, and T become Λ1, Λ2, Λ3, Λ4, and Λ5, respectively. In other words, the widths and distances of the electrode patterns are made different between the areas P, Q, R, S, and T. Subsequently, a pulse voltage is applied to the electrode patterns, thereby obtaining the periodic polarization structure as shown in FIG. 5. Although the electrode patterns are usually removed after the periodic polarization structure has been thus formed, the electrode patterns can be kept as they are.

As described above, the wavelength conversion element 42 has polarization inversion structures respectively in the areas P through T with the periods (pitches) different from each other. Therefore, the light beams transmitted through the areas P through T are converted in the wavelength components λ01 through λ05 slightly different from each other out of the various wavelength components included in the light beams with the peak wavelength λ0 into the light beams with the wavelengths λ1, λ2, λ3, λ4, λ5, slightly different from each other, respectively.

In the case of using a blue laser source device as an exemplification for a further explanation, the light beams with wavelengths around the wavelengths λ01=920 nm, λ02=918 nm, λ03=916 nm, λ04=914 nm, λ05=912 nm out of the light beams with the peak wavelengths λ0=920 nm emitted from the light emitting elements 41a, 41b, 41c, 41d, 41e are converted into the light beams with the wavelengths λ1=460 nm, λ2=459 nm, λ3=458 nm, λ4=457 nm, λ5=456 nm, respectively.

Similarly, in the case of using a green laser source device as an exemplification for a further explanation, the light beams with wavelengths around the wavelengths λ01=1060 nm, λ02=1058 nm, λ03=1056 nm, λ04=1054 nm, λ05=1052 nm out of the light beams with the peak wavelengths λ0=1060 nm emitted from the light emitting elements 41a, 41b, 41c, 41d, 41e are converted into the light beams with the wavelengths λ1=530 nm, λ2=529 nm, λ3=528 nm, λ4=527 nm, λ5=526 nm, respectively.

Further, similarly, in the case of using a red laser source device as an exemplification for a further explanation, the light beams with wavelengths around the wavelengths λ01=1240 nm, λ02=1238 nm, λ03=1236 nm, λ04=1234 nm, λ05=1232 nm out of the light beams with the peak wavelengths λ0=1240 nm emitted from the light emitting elements 41a, 41b, 41c, 41d, 41e are converted into the light beams with the wavelengths λ1=620 nm, λ2=619 nm, λ3=618 nm, λ4=617 nm, λ5=616 nm, respectively.

It should be noted that these wavelengths cited herein are nothing more than mere examples.

The wavelength selection elements 43 has the Peltier element 16a (the temperature varying section) bonded only on one end surface 43c.

Further, the bandpass filter for narrowing the band of the wavelength by repeatedly reflecting the light is used as the wavelength selection element 43.

The wavelength selection element 43 narrows the width of the wavelength band in the spectral line width of the light emitted from the light emitting section 41 within the band of about 5 nm wide. Further, it is preferable that the width of the wavelength band in the spectral line width of the light emitted from the light emitting section 41 is within the band of about 10 nm wide.

Further, in the case with the blue laser source device, for example, the Peltier element 16a is controlled so that the wavelengths of the light beams transmitted through the areas A through E become 920 nm, 916 nm, 912 nm, 914 nm, 918 nm, respectively. In the case with the green laser source device, the Peltier element 16a is controlled so that the wavelengths of the light beams transmitted through the areas A through E of the wavelength selection element 43 become 1060 nm, 1056 nm, 1052 nm, 1054 nm, 1058 nm, respectively. In the case with the red laser source device, the Peltier element 16a is controlled so that the wavelengths of the light beams transmitted through the areas A through E become 1240 nm, 1236 nm, 1232 nm, 1234 nm, 1238 nm, respectively.

It should be noted that these wavelengths cited herein are nothing more than mere examples.

The resonant mirror 44 is for reflecting the laser beams W1 (i.e., the light beams with the wavelengths $\lambda 01$ through $\lambda 05$), which have not been converted by the wavelength conversion element 42 into the light beams with the predetermined wavelengths $\lambda 1$ through $\lambda 5$, towards the light emitting section 41, and transmitting the other laser beams.

The light beams W1 (illustrated with the broken line shown in FIG. 5) reflected by the resonant mirror 44 pass through the wavelength selection element 43 and the wavelength conversion element 42 again, and return to the light emitting elements 41a through 41e. Although the light beams returned to the light emitting elements 41a through 41e are partially converted into heat there, large proportions of the light beams are used effectively, for example, as energy for emitting light or for being emitted again from the light emitting elements 41a through 41e after being reflected inside the light emitting elements 41a through 41e.

Meanwhile, the light beams W2 (illustrated with the chain double-dashed lines shown in FIG. 5), which are converted into the light beams with the wavelengths $\lambda 1$ through $\lambda 5$, respectively, by the wavelength conversion element 42 and transmitted through the wavelength selection element 43, are transmitted through the resonant mirror 44.

As is explained hereinabove, it is arranged that the light beams W3 emitted from the light emitting section 41 are repeatedly reflected by the light emitting section 41 and the resonant mirror 44, and the converted light beams W2 (illustrated with the chain double-dashed lines shown in FIG. 5) converted into the light beams with the predetermined wavelengths are emitted from the resonant mirror 44. In other words, the resonant mirror 44 has the function as the resonator mirror for the light emitting elements 41a through 41e, although the operation thereof is slightly different from that of the resonant mirror 15 of the first embodiment.

In the light source device 40 according to the present embodiment, by the combination of the wavelength conversion element 42, which makes the conversion into the different wavelengths $\lambda 1$ through $\lambda 5$ possible by using different domain pitches in the areas P through T, and the wavelength selection element 43 provided with the plurality of areas A through E with the selection wavelengths different from each other, it becomes possible to make the wavelengths of the light beams transmitted through the wavelength selection element 43 different from each other. Therefore, since the wavelength band of the light emitted from the resonant mirror 44 becomes wider compared to the case in which the light beams with the same wavelengths are emitted from all of the areas, the coherence between the laser beams is reduced. As a result, it becomes possible to obtain the light source device 40 with suppressed speckle noise.

Further, as described above, in the present embodiment, since the wavelength selection element 43 with a narrow width of the wavelength band of the light transmitted therethrough is provided, the low-price resonant mirror with a large width of the wavelength band of the reflected light can be used, thus it becomes possible to achieve cost reduction of the entire device.

As described above, the light source device 40 according to the present embodiment of the invention can be low-cost, reduce the coherence between the laser beams, and suppress the speckle noise.

It should be noted that although the wavelength selection element 43 is disposed on the light paths between the wavelength conversion element 42 and the resonant mirror 44, it is also possible to dispose the wavelength selection element 43 on the light paths between the light emitting section 41 and the wavelength conversion element 42.

Further, although in the present embodiment, those having peak wavelengths roughly identical to each other are used as the plurality of light emitting element 41a through 41e, it is also possible to use the light emitting elements with peak wavelengths different from each other purposely. Specifically, it is also possible that the light emitting elements 41a, 41b, 41c, 41d, 41e respectively having the peak wavelengths $\lambda 01, \lambda 02, \lambda 03, \lambda 04, \lambda 05$ are used, and the Peltier element 16a is controlled so that the light beams with the same wavelengths as the respective peak wavelengths of the light emitting elements 11a through 11e are selected in the areas A though E, respectively. As described above, by making the peak wavelengths of the light emitting elements 11a through 11e and the selection wavelengths in the areas A through E in the wavelength selection element 43 respectively identical to each other, it becomes possible to improve the efficiency of the light beams.

Further, in the present embodiment, it is also possible to provide the Peltier element to each of the areas A through E to control the temperature of each of the areas A through E of the wavelength selection element 43.

Further, although in the specific example, the maximum difference in wavelength between the light beams emitted respectively from the areas A through E is assumed to be about 4 nm, the chromaticity of the light sensed by the human does not vary providing the maximum difference is within the range of about 10 nm. As described above, by suppressing the maximum difference in wavelength between the light beams emitted respectively from the areas A through E within the range of about 10 nm, in the case of using the light source device 40 for an image display device, for example, it becomes possible to display an extremely sharp image.

Further, a piezoelectric element can be used instead of the Peltier element.

Modified Example of Second Embodiment

Although the pitches of the periodic polarization structures of the wavelength conversion element 42 are made different from each other in the manufacturing process in the second embodiment shown in FIG. 5, there can be adopted a light source device 50 using the wavelength conversion element 52 having the same pitches of the periodic polarization structures in the manufacturing process.

Figure 7:
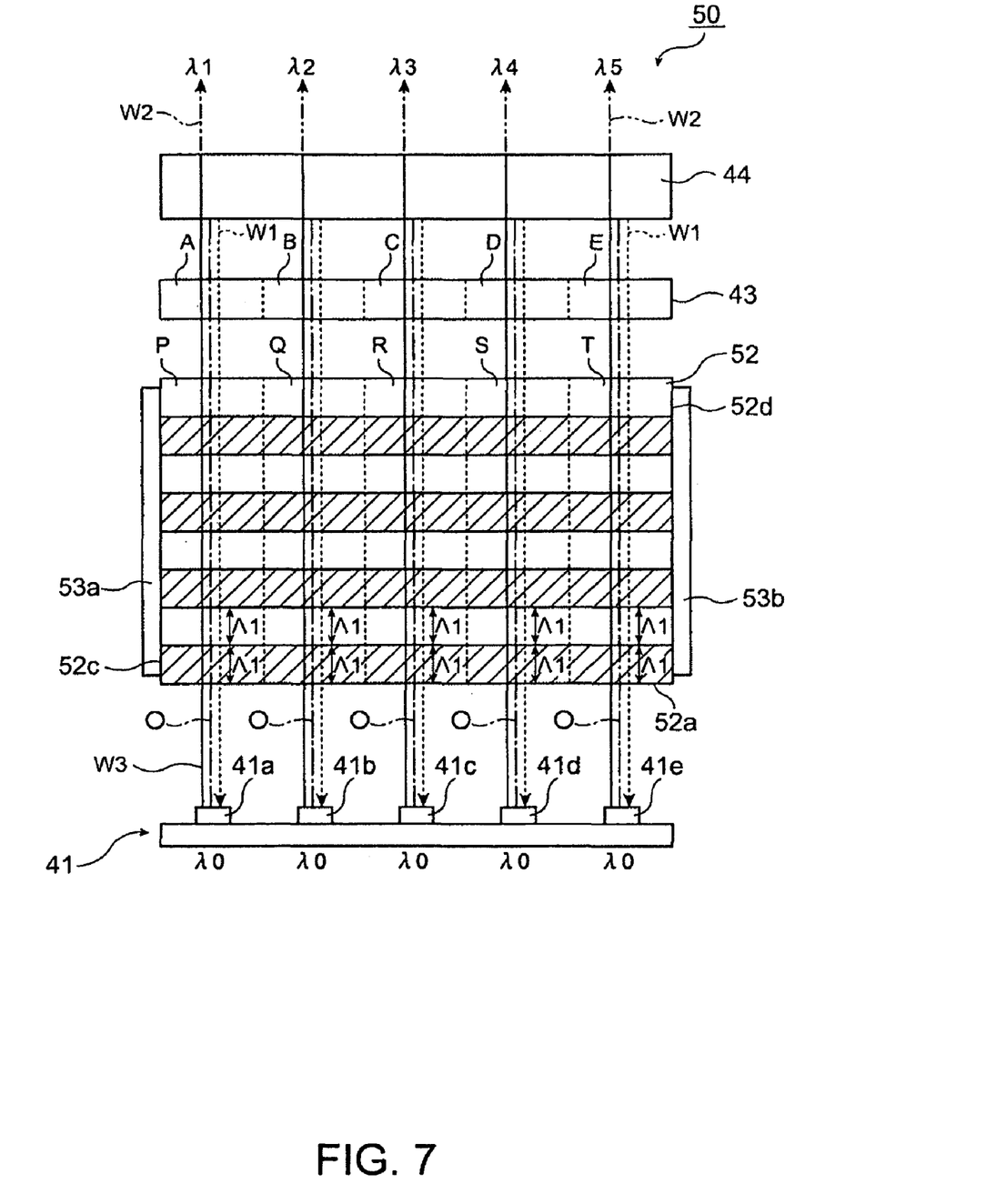
FIG. 7 is a plan view showing a modified example of the light source device shown in FIG. 5.

As shown in FIG. 7, in the light source device 50, the widths $\Lambda 1$ (hereinafter referred to as "pitches") of the domains of the respective areas P, Q, R, S, and T in the 0 directions of the center axes of the laser beams are identical to each other.

Further, on one end surface 52c (an end surface near to the area P) of the wavelength conversion element 52 perpendicular to the entrance end surface 52a, which the light emitted from the light emitting section 41 enters, and the other end surface 52d (an end surface near to the area T) opposed to the one end surface 52c, there are bonded Peltier elements 53a, 53b (the temperature varying section). Similarly to the wavelength selection element 43, the wavelength conversion element 52 also expands in response to heating, and shrinks in response to cooling, thus the domain pitches are varied. In response to the domain pitches, the conversion wavelength of the wavelength conversion element 52, namely the wavelength of the light converted by the wavelength conversion element 52, is varied.

Then, in the case with the blue light source device as an exemplification for a further explanation, the peak wavelengths of the light beams emitted respectively from the light emitting elements 41a through 41e are $\lambda 01=920$ nm, $\lambda 02=916$ nm, $\lambda 03=912$ nm, $\lambda 04=914$ nm, $\lambda 05=918$ nm, respectively. The temperature of the wavelength conversion element 52 is controlled by the Peltier elements 53a, 53b so that the conversion wavelengths in the areas P through T become $\lambda 1=460$ nm, $\lambda 2=458$ nm, $\lambda 3=456$ nm, $\lambda 4=457$ nm, $\lambda 5=459$ nm, respectively.

According to the present modified example, even in the case in which the domain pitches $\Lambda 1$ in the manufacturing process of the wavelength conversion element 52 are the same, the domain pitches of the respective areas P through T can be made different from each other by the Peltier elements 53a, 53b. Therefore, by combining the wavelength conversion element 52 arranged to be capable of conversion to different wavelengths and the wavelength selection element 43 having selection wavelengths different between the areas A through E, it becomes possible to make the wavelengths of the light beams emitted from the wavelength selection element 43 different from each other. Therefore, since the wavelength band of the light emitted from the resonant mirror 44 becomes wider compared to the case in which the light beams with the same wavelengths are emitted from all of the areas, the coherence between the laser beams is reduced. As a result, it becomes possible to obtain the light source device 50 with suppressed speckle noise.

It should be noted that in the present modified example, similarly to the modified example of the first embodiment shown in FIG. 4, it is possible to control the temperature of each of the areas A through E by the temperature varying section 35. Further, it is also possible that the temperature sensor (the state detection section) is provided for each of the areas A through E of the wavelength selection element 43, or for every plural number of areas out of the areas A through E, and the state of the areas A through E of the wavelength selection element 43 can be varied in accordance with the temperature of the areas A through E detected by the temperature sensors so that the wavelengths of the light beams selected by the areas A through E become different from each other.

Further, it is also possible that the temperature sensor (the state detection section) is provided for each of the areas P through T of the wavelength conversion element 52, or for every plural number of areas out of the areas P through T, and the state of the areas P through T of the wavelength conversion element 52 can be varied in accordance with the temperature of the areas P through T detected by the temperature sensors so that the wavelengths of the light beams converted by the areas P through T become different from each other.

Further, by using the temperature sensors to both of the wavelength selection element 43 and the wavelength conversion element 52, the selection wavelength in the wavelength selection element 43 and the conversion wavelength in the wavelength conversion element 52 can be made identical to each other, and consequently, the light beams emitted from the light emitting section 41 can effectively be taken out from the resonant mirror 44. Therefore, it becomes possible to improve the efficiency of the light beams.

Third Embodiment

Figure 8:
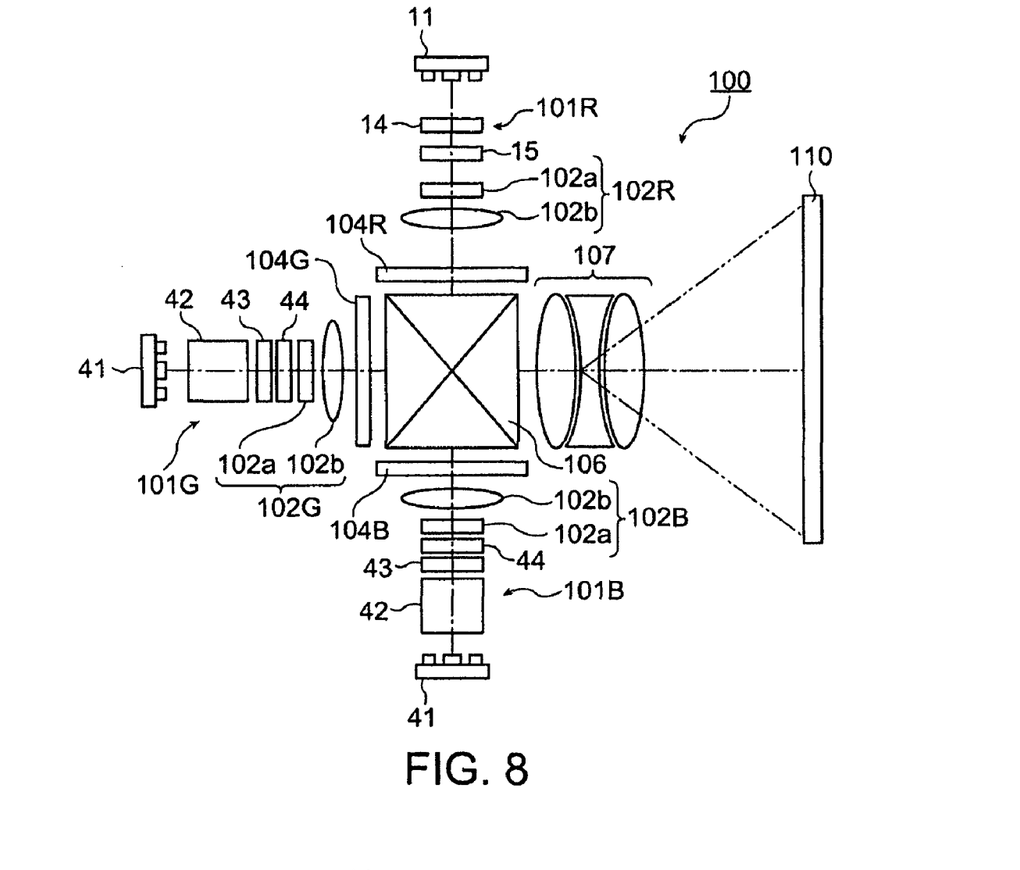
FIG. 8 is a plan view showing an image display device according to a third embodiment of the invention.

A third embodiment according to the invention will now be explained with reference to FIG. 8.

In the present embodiment, an image display device 100 equipped with both of the light source devices 10, 40 according to the first and second embodiments described above will be explained. It should be noted that in FIG. 8, a chassis forming the image display device 100 is omitted for the sake of simplification.

In the image display device 100, as a red laser source 101R (the light source device) for emitting a red beam, the light source device 10 in the first embodiment described above is used, and as a green laser source 101G (the light source device) and a blue laser source 101B (the light source device) for emitting a green beam and a blue beam, the light source devices 40 of the second embodiment described above are used.

Further, the image display device 100 is provided with liquid crystal light valves 104R, 104G, 104B (light modulation devices) for respectively modulating the laser beams emitted from the laser sources 101R, 101G, 101B, a cross dichroic prism 106 (colored light beams combining section) for combining the light beams emitted from the liquid crystal light valves 104R, 104G, 104B, and a projection lens 107 (a projection device) for enlargedly projecting an image formed by the liquid crystal light valves 104R, 104G, 104B on a screen 110.

Further, in order for equalizing the illumination distribution of the laser beams emitted from the laser beam sources 101R, 101G, 101B, the image display device 100 is provided with equalizing optical systems 102R, 102G, 102B disposed downstream of the laser beam sources 101R, 101G, 101B along the optical paths, respectively, and illuminates the liquid crystal light valves 104R, 104G, 104B with the light beams having the illumination distribution equalized by the equalizing optical systems 102R, 102G, 102B. For example, the equalizing optical systems 102R, 102G, 102B are each composed, for example, of a hologram 102a and a field lens 102b.

The three colored light beams modulated by the respective liquid crystal light valves 104R, 104G, and 104B enter the cross dichroic prism 106. The prism is formed by bonding four rectangular prisms, and is provided with a dielectric multilayer film for reflecting red light beam and a dielectric multilayer film for reflecting blue light beam disposed on the inside surfaces forming a crisscross. The three colored light beams are combined by these dielectric multilayer films to form a light beam for representing a color image. Further, the light beam obtained by combining the three colored light beams is projected on the screen 110 by the projection lens 107, thus an enlarged image is displayed.

In the image display device 100 of the present embodiment described above, the light beams emitted from the red laser source 101R, the green laser source 101G, and the blue laser source 101B have become light beams with reduced coherence. Therefore, the light projected by the projection lens 107 becomes the light with suppressed speckle noise. Therefore, it becomes possible to display a preferable image on the screen 110.

It should be noted that although the image display device using the light source devices 40 of the second embodiment as the green and blue laser sources 101G, 101B is explained as the image display device of the present embodiment, other light source devices described in the first and second embodiment (including the modified examples) can also be used instead thereof. On this occasion, it is possible to adopt the light source devices of the different embodiments respectively to the laser sources 101R, 101G, 101B, or to adopt the light source devices of the same embodiment. Further, the red laser source 101R can also have the configuration for converting the infrared beam into the visible light by the wavelength conversion element similarly to the blue laser source 101G and the green laser source 101B.

Further, although the transmissive liquid crystal light valves are used as the light modulation devices, light valves other than the liquid crystal type can also be used, or reflective light valves can also be used. As such a light valve, a reflective liquid crystal light valve, a digital micromirror device, and so on can be cited. The configuration of the projection optical system is appropriately modified in accordance with the type of the light valves used therein.

Figure 9:
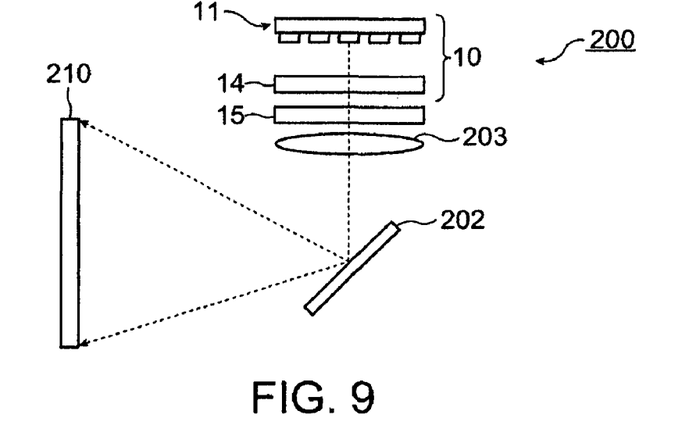
FIG. 9 is a plan view showing another image display device according to the third embodiment of the invention.

Further, the light source devices of the first and the second embodiments (including the modified examples) can be applied to a scan type image display device. An example of such an image display device is shown in FIG. 9. The image display device 200 shown in FIG. 9 is provided with the light source device 10 according to the first embodiment, an MEMS mirror (a scanning section) 202 for scanning the screen 210 with the light emitted from the light source device 10, and a condenser lens 203 for collecting the light emitted from the light source device 10 on the MEMS mirror 202. The light emitted from the light source device 10 is led so as to scan on the screen 210 in the horizontal direction and the vertical direction by moving the MEMS mirror. In the case of displaying a color image, it is possible to configure the plurality of light emitting elements, which forms the light emitting section 11, by a combination of the light emitting elements having peak wavelengths corresponding to red, green, and blue, respectively.

Fourth Embodiment

Figure 10:
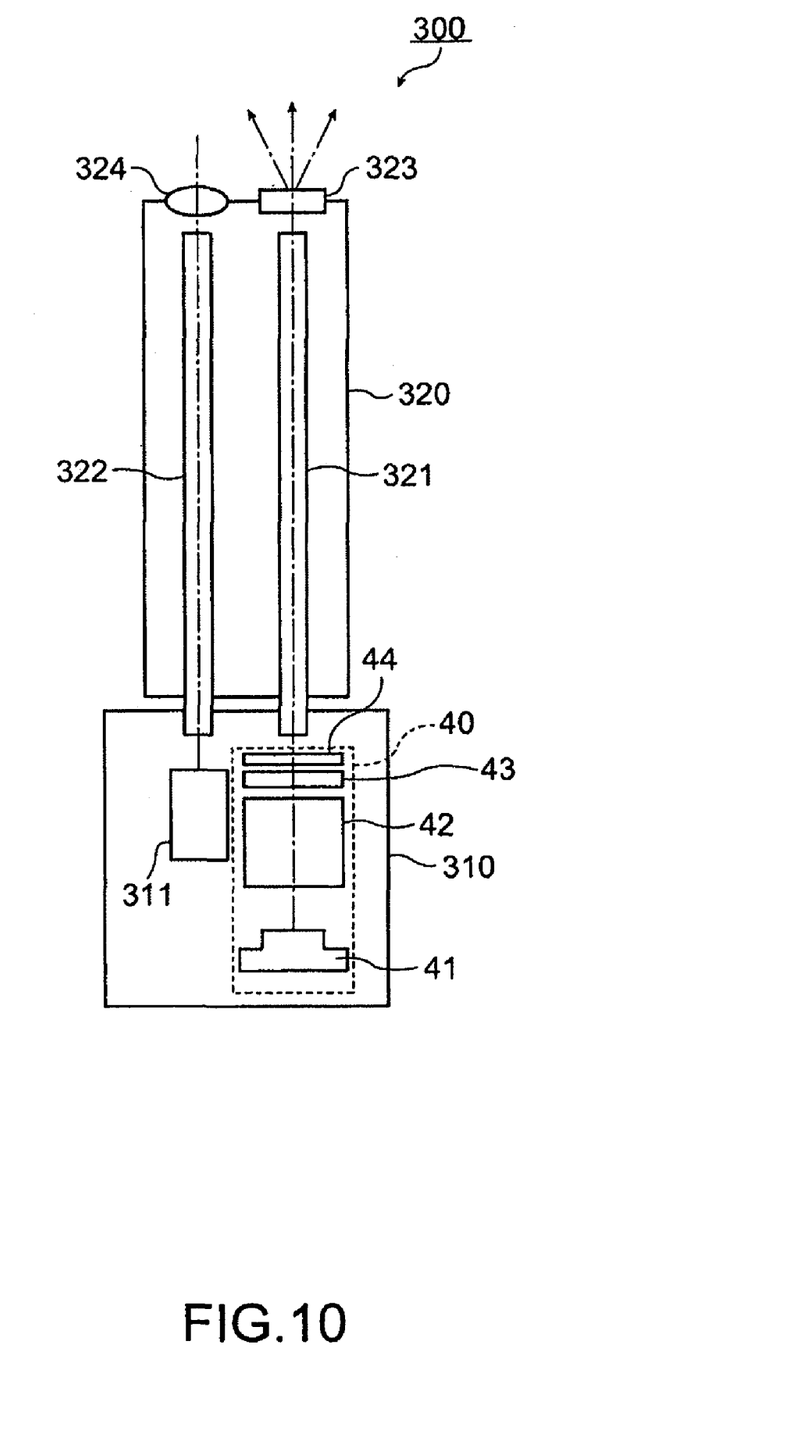
FIG. 10 is a plan view showing a monitor device according to a fourth embodiment of the invention.

A configuration example of a monitor device 300 applying the light source device 40 according to the second embodiment will now be explained. FIG. 10 is a schematic diagram showing an outline of the monitor device. The monitor device 300 is provided with a device main body 310 and an optical transmission section 320. The device main body 310 is provided with the light source device 40 according to the second embodiment.

The optical transmission section 320 is provided with two light guides 321, 322 of a light transmission side and a light reception side, respectively. Each of the light guides 321, 322 is a bundle of a number of optical fibers, and is capable of transmitting a laser beam over a long distance. On the entrance side of the light guide 321 of the light transmission side, there is disposed the laser source device 10, while on the emission side thereof there is disposed a diffusion plate 323. The laser beam emitted from the laser source device 40 is transmitted to the diffusion plate 323 disposed on the tip of the light transmission section 320 through the light guide 321, and is diffused by the diffusion plate 323 to illuminate an object.

On the tip of the light transmission section 320, there is also provided an imaging lens 324, and the reflected light beam from the object can be received by the imaging lens 324. The reflected light beam thus received is transmitted through the light guide 322 of the light reception side to a camera 311 as an imaging section disposed inside the device main body 310. As a result, the reflected light obtained by irradiating the object with the laser beam emitted from the laser source device 40 can be imaged by the camera 311.

According to the monitor device 300 configured as described above, since the light source device 40 emits the light with the suppressed speckle noise, it becomes possible to shoot the object clearly by the camera 311.

It should be noted that although the monitor device using the light source device 40 of the second embodiment is explained as the monitor device of the present embodiment, the light source devices of other embodiment (including the modified examples) can also be used.

It should be noted that the scope of the invention is not limited to the embodiments described above, but various modifications can be executed thereon within the scope or the spirit of the invention.

For example, although the cross dichroic prism is used as the colored light composition section, the colored light composition section is not limited thereto. As the colored light composition section, what has dichroic mirrors in a cross arrangement to combine the colored light beams, or what has dichroic mirrors arranged in parallel to each other to combine the colored light beams, and so on can be used.

The entire disclosure of Japanese Patent Application No. 2007-224396, filed Aug. 30, 2007 is expressly incorporated by reference herein.

What is claimed is:

1. A light source device comprising:
a plurality of light emitting elements for emitting light beams;
a resonant mirror functioning as a resonator for selectively reflecting the light beams emitted respectively from the light emitting elements, towards the light emitting elements;
a wavelength selection element disposed on light paths between the light emitting elements and the resonant mirror, having a plurality of light selection areas for executing selection respectively on the light beams emitted respectively from the light emitting elements, transmitting light beams each having a part of a wavelength band of corresponding one of the light beams emitted respectively from the light emitting elements, and having a narrower width of a wavelength band of the light beam to be transmitted than a width of wavelength band of the light beam to be reflected by the resonant mirror; and
a state changing section that changes a state of the plurality of light selection areas,
wherein the state changing section changes the state of the light selection areas so that wavelengths of the light beams selected respectively by the light selection areas become different from each other.

2. The light source device according to claim 1,
wherein the state changing section is provided to each of the light selection areas.

3. The light source device according to claim 2, further comprising:
a state detection section that detects the state of the plurality of light selection areas,
wherein the state changing section changes the state of the plurality of light selection areas in accordance with the state of the plurality of light selection areas detected by the state detection section so that the wavelengths of the respective light selection areas become different from each other.

4. The light source device according to claim 3,
wherein the state detection section is provided to each of the light selection areas.

5. The light source device according to claim 3,
wherein the state detection section is a temperature detection section that detects the temperature of the plurality of light selection areas, and
the state changing section is a temperature varying section that varies the temperature between the light selection areas in accordance with the temperature detected by the temperature detection section.

6. A light source device comprising:

a plurality of light emitting elements for emitting light beams;

a wavelength conversion element having a plurality of light transmission areas through which the light beams emitted respectively from the light emitting elements are respectively transmitted, and converting wavelengths in at least a part of a wavelength band of the light beams emitted from the light emitting elements;

a resonant mirror functioning as a resonator for selectively reflecting the light beams emitted respectively from the light emitting elements, towards the light emitting elements;

a wavelength selection element having a plurality of light selection areas for executing selection respectively on the light beams emitted respectively from the light emitting elements, transmitting light beams each having a part of a wavelength band of corresponding one of the light beams emitted respectively from the light emitting elements, and having a narrower width of a wavelength band of the light beam to be transmitted than a width of wavelength band of the light beam to be reflected by the resonant mirror; and a selection side state changing section that changes a state of the plurality of light selection areas of the wavelength selection element, wherein the selection side state changing section changes the state of the light selection areas of the wavelength selection element so that wavelengths of the light beams selected respectively by the light selection areas of the wavelength selection element become different from each other.

7. The light source device according to claim 6, further comprising:

a selection side state detection section that detects a state of the plurality of light selection areas of the wavelength selection element, wherein the selection side state changing section changes the state of the plurality of light selection areas in accordance with the state of the plurality of light selection areas detected by the selection side state detection section so that the wavelengths of the respective light selection areas of the wavelength selection element become different from each other.

8. The light source device according to claim 7, wherein the selection side state detection section is a temperature detection section that detects the temperature of the plurality of light selection areas of the wavelength selection element, and the selection side state changing section is a temperature varying section that varies the temperature between the light selection areas of the wavelength selection element in accordance with the temperature detected by the temperature detection section.

9. The light source device according to claim 6, further comprising:

a conversion side state changing section that changes a state of the plurality of light transmission areas of the wavelength conversion element so that the wavelengths of the light beams converted by the respective light transmission areas become different from each other.

10. An image display device comprising:

the light source device according to claim 1;

a light modulation device for modulating the light beam emitted from the light source device in accordance with an image signal to form an image; and a projection device for projecting the image formed by the light modulation device.

11. An image display device comprising:

the light source device according to claim 1; and a scan section that scans a projection screen with the light beam emitted from the light source device.

12. A monitor device comprising:

the light source device according to claim 1; and an imaging section that shoots an object illuminated by the light source device.

* * * * *